United States Patent [19]

Hepp

[11] Patent Number: 5,400,298
[45] Date of Patent: Mar. 21, 1995

[54] TOWED HYDROPHONE STREAMER WITH DISTRIBUTED ELECTRONICS HOUSINGS

[75] Inventor: John S. Hepp, Irving, Tex.

[73] Assignee: Whitehall Corporation, Dallas, Tex.

[21] Appl. No.: 126,057

[22] Filed: Sep. 23, 1993

[51] Int. Cl.$^6$ .......................................... G01V 1/38
[52] U.S. Cl. .................................. 367/20; 367/154; 174/101.5
[58] Field of Search .................. 367/20, 154, 153; 174/101.5

[56] References Cited

U.S. PATENT DOCUMENTS

| | | | |
|---|---|---|---|
| 2,614,143 | 10/1952 | Williams | 327/171 |
| 2,708,742 | 5/1955 | Harris | 340/7 |
| 2,782,059 | 2/1957 | Stranberg | 285/247 |
| 2,900,536 | 8/1959 | Palo | 310/9.6 |
| 3,177,016 | 4/1965 | Holmgren | 285/247 |
| 3,258,739 | 6/1966 | Hurley | 340/10 |
| 3,333,236 | 7/1967 | Schloss | 340/8 |
| 3,418,624 | 12/1968 | Massa | 340/9 |
| 3,739,326 | 6/1973 | Kerr et al. | 340/7 |
| 3,744,016 | 7/1973 | Davis | 174/101.5 |
| 3,764,848 | 10/1973 | Berlincourt | 315/55 |
| 3,996,553 | 12/1976 | Siems et al. | 340/15 |
| 4,012,649 | 3/1977 | Cook et al. | 310/8.3 |
| 4,092,629 | 5/1978 | Siems et al. | 340/15 |
| 4,160,229 | 7/1979 | McGough | 340/7 |
| 4,204,188 | 5/1980 | Weichart et al. | 367/154 |
| 4,437,689 | 3/1984 | Goebel et al. | 285/246 |
| 4,464,739 | 8/1984 | Moorcroft | 367/20 |
| 4,491,939 | 1/1985 | Carpenter | 367/20 |
| 4,733,379 | 3/1988 | Lapetina et al. | 367/20 |
| 4,736,969 | 4/1988 | Fouts | 285/247 |
| 4,782,470 | 11/1988 | Poturnicki et al. | 367/157 |
| 4,787,069 | 11/1988 | Beauducel et al. | 367/21 |
| 4,819,216 | 4/1989 | Fraioli | 367/154 |
| 4,901,287 | 2/1990 | Hathaway et al. | 367/3 |
| 4,951,265 | 8/1990 | Buckles | 367/18 |
| 4,967,400 | 10/1990 | Woods | 367/21 |
| 5,008,581 | 4/1991 | Kumada et al. | 310/323 |

FOREIGN PATENT DOCUMENTS 2137750 10/1984 United Kingdom.
2145226 3/1985 United Kingdom.

OTHER PUBLICATIONS

Proffitt, Jack M. "A History of Innovation in Marine Seismic Data Acquisition", *Geophysics: The Leading Edge of Exploration*, p. 24 (Mar. 1991).

Primary Examiner—Ian J. Lobo
Attorney, Agent, or Firm—Konneker Bush Hitt & Chwang

[57] ABSTRACT

Disclosed is a towed hydrophone streamer module comprising: (1) an elongated, fluid-resistant jacket having a substantially circular cross section, the water resistant jacket having mating connectors at ends thereof, (2) a plurality of sensors distributed in a spaced-apart relationship within the jacket, (3) a data bus positioned along a length of the jacket and terminating in electrical contacts in the mating connectors and (4) a plurality of cylindrical, fluid-resistant electronics housings disposed within the jacket in a spaced-apart relationship along a length thereof, each of the plurality of housings having a circuit board therein and spanning a length thereof and end caps at ends thereof, one of the end caps having electrical contacts coupled to components on the circuit board, a center-line of the housings substantially in alignment with a center-line of the jacket, the components coupling the plurality of sensors to the data bus for electrical communication therewith. In contrast with prior art streamers having electronics canisters centrally located between modules, the present invention spreads the electronics throughout the module, decreasing the viscous and turbulent drag of the module as it is towed, spreading heat dissipation more evenly throughout the module and allowing the jacket to be only 2 inches in diameter, in a preferred embodiment.

20 Claims, 3 Drawing Sheets

TOWED HYDROPHONE STREAMER WITH DISTRIBUTED ELECTRONICS HOUSINGS

TECHNICAL FIELD OF THE INVENTION

The present invention is directed, in general, to towed hydrophone streamers and, more particularly, to an arrangement whereby signal conditioning, quantizing, multiplexing and transmission electronics are spread throughout each module in the streamer to yield a significantly thinner, more flexible and quieter streamer.

BACKGROUND OF THE INVENTION

It is now common practice to explore the oceans of the earth for deposits of oil, gas and other valuable minerals by seismic techniques in which an exploration vessel imparts an acoustic wave into the water, typically by use of a compressed air "gun." The acoustic wave travels downwardly into the sea bed and is reflected at the interfaces between layers of materials having varying acoustic impedances. The wave travels; back upwardly where it is detected by microphone or "hydrophone" elements in a streamer towed by the vessel to yield information regarding characteristics of the underwater material and structures.

A towed streamer comprises a plurality of pressure-sensitive hydrophone elements enclosed within a waterproof jacket and electrically coupled to recording equipment onboard the vessel. Each hydrophone element within the streamer is designed to convert the mechanical energy present in pressure variations surrounding the hydrophone element into electrical signals. Due to its often extreme length (on the order of kilometers), the streamer is divided into a number of separate sections or "modules" that can be decoupled from one another and that are individually waterproof. Individual streamers can be towed in parallel through the use of paravanes to create a two dimensional array of hydrophone elements. Data buses running through each of the modules in the streamer carry the signals from the hydrophone elements to the recording equipment (so-called "acoustic data").

In addition to acoustic data, it is also important to collect and transmit data concerning operational status of the array to the vessel (so-called "nonacoustic data"). Nonacoustic data comprises physical characteristics of interest regarding the operation of each module, including whether water has invaded a module in the streamer, module temperature, module depth and power supply voltage.

Today, many towed arrays have digital data channels. The primary advantage of digital data transmission is its ability to handle a significantly greater number of sensors for a given streamer size. For example, streamers with a thousand or more. sensors would be of an impractical large diameter to simply contain the analog bus conductors therein. Also, with digital data transmission, data transmission rates are higher and, with proper attention to shielding of electromagnetic interference, data fidelity is maintained from the hydrophone to the recording equipment.

For instance, U.S. Pat. No. 3,996,553, that issued on Dec. 7, 1976 is directed to a plurality of data acquisition units connected to a central signal processor through a common digital telemetry link. The telemetry link includes a data channel, an interrogation channel and a control channel. The central signal processor sends an interrogation signal through the interrogation channel to the data acquisition units. As each data acquisition unit recognizes the interrogation signal, it transmits its acquired data back up to the central processor through the data channel. Any selected data acquisition unit, when it receives a control signal through the control channel at the same time that it receives an interrogation signal through the interrogation channel, can be caused to perform a function different from all other units. The signal propagation velocity through the control channel is different from the signal propagation velocity through the interrogation channel. One of the two signals may be transmitted through the faster channel at a selected time later than the other of the two signals is transmitted through the slower channel. The selected time difference between the transmission of the two signals is proportional to the ratio of signal propagation delay difference between channels. Accordingly, the signal propagating through the faster channel will overtake and intercept the signal propagating through the slower channel at the selected data acquisition unit. Each data acquisition unit may have one or more input channels. Each input channel is connected in turn to the data channel through a stepping switch or multiplexer. The interrogation signal may exist in one of two or more states. In the first state, the interrogation signal resets the multiplexer, in the second state, the interrogation signal advances the multiplexer to the next input channel in sequence. Thus, this system allows for control signals to command changes of state within the individual multiplexers in the system.

In the past, these data acquisition units were physically housed in metal canisters located between the modules in the streamer. Being metal and containing electronic components, the canisters were relatively heavy. Thus, the canisters were made large (on the order of 4–5 inches in diameter and 15–18 inches in length) and spacious inside to give the canisters an overall near-neutral buoyancy.

As an exemplary teaching of such a canister arrangement, U.S. Pat. No. 4,092,629, that issued on May 30, 1978, is directed to a seismic sensor streamer having 50 modules and much of the seismic data processing electronics decentralized into the cable structure itself. The streamer is coupled to a central station mounted in a recording vehicle. The central station includes recording circuitry and apparatus to receive, process and record digital data words from a data link in the streamer and circuity for transmitting control signals into an interrogation link in the streamer. The electrical output of each sensor unit constitutes a separate input channel. The modules are spaced apart and interconnected by small diameter, cylindrical inter-module canisters that contain a transceiver unit for processing the signals from ten sensor units in an associated module. Contained within each transceiver unit is a multiplexer having a plurality of filtered input channels coupled respectively to the elemental sensor units, and an output. In response to a first interrogation pulse transmitted through the interrogation link from the central station unit, the multiplexer advances to a selected input channel to acquire a first analog data sample. A second interrogation pulse sequences the respective multiplexers in all 50 modules to select a second channel for sampling and digitizing to provide digital data words for the respective second channels. The self-clocking phase-encoded data words transmitted from the respective transceiver associated with each module are ordered in accordance with the propagation delay time of the interrogation link between the central station and the respective transceiver units. Self-clocking data words from corresponding channels within the respective transceiver units are ordered in accordance with the channel-select sequence during a scan cycle.

Unfortunately, the inter-module canisters had several significant disadvantages. First, since they were of large diameter compared to the modules, they created viscous drag and turbulence when the streamer was towed. Not only was the streamer required to be stronger (thus heavier) to handle the extra strain caused by the drag, but the turbulence churned water, distorting the acoustic signals before they reached the hydrophones and impairing signal quality.

Second, since streamers are commonly stowed on large spools (involving bending of the streamer around curved surfaces under tension) when not in use, the inflexible canisters presented storage problems. All long, flexible structures (such as ropes, streamers or bananas) have minimum bend radii beyond which excessive internal stresses may damage the structure, particularly if the structure is subject to axial stress. The canisters created strain on the ends of the modules as the modules were forced to bend and stretch to adjust for the inflexibility and length of the canisters length (15–18 inches). Since they were of large diameter (4–5 inches versus less than 3 inches for the module), they created lumps in the stored streamer. In an effort to alleviate the strain and lump problems, workers had to insert pads or blocks around the canisters as the streamer was wound onto its spool to cushion the modules. The workers also had to remove these pads or blocks when the streamer was deployed from the spool.

Third, the signals emanating from hydrophones are of extremely low level since hydrophones are of high impedance, the pressure signals from the ocean floor are weak and the volume of piezoelectric material in the hydrophones is low for economic and space reasons. Signal attenuation and distortion due to the length of wire, triboelectric noise generated when the wire is flexed due to streamer motions and electromagnetically coupled noise from other wires within the streamer (e.g. digital telemetry data) all contribute to degradation of the hydrophone signal. It is optimal to transmit the hydrophone signals over the shortest possible wire distance. Since a module is typically 50 to 100 meters long, hydrophone signals had to travel, on average, half the length of the module before being processed in the prior art inter-module canisters, degrading signal quality.

Fourth, electronic circuits are typically "active" in the sense that power must be supplied for their proper function. Such circuits dissipate most of their input power as heat, which must be managed so that high temperatures (that tend to shorten the life of electronic components) are avoided. Areas of high circuit concentration (such as the prior art canisters) are, in general, more prone to heat concentration (and resulting high temperatures) than spatially distributed circuitry.

Finally, the inter-module canisters represented yet more parts that had to be assembled to create a streamer and required the use of twice the number of connectors.

To date, deepwater seismic streamers have had a diameter of at least 2.8 inches, although some small streamers of limited capability and employed for specialized work have been of less diameter. This large diameter was necessary to house larger, stronger strain cables and larger diameter hydrophones. This larger diameter posed a storage problem, as such streamers are typically more than 3 km long. The sheer volume of the streamer and handling equipment exacerbated the modern practice of towing multiple streamers in an array. Further, as damaged modules must be shipped to repair sites, the larger diameter posed a shipping problem.

What is needed in the art is a towed hydrophone streamer that eliminates the inter-module canisters, distributing the electronics instead within each module to yield a streamer that is thinner, more flexible, quieter and has fewer connectors.

SUMMARY OF THE INVENTION

To address the above-discussed deficiencies of the prior art, it is a primary object of the present invention to provide a module for a towed hydrophone streamer that has a diameter less than 2.8 inches and eliminates the inter-module canisters. Although this may seem to be simply a matter of making everything in the streamer smaller, such is not the case. To achieve a smaller diameter, it becomes necessary to distribute the various signal processing and transmission electronics assemblies throughout each module of the streamer and to package the assemblies in a manner that has the least acoustic, electromagnetic and thermal effects on hydrophones within the assembly. Therefore, to meet the primary object, it is necessary to provide a distributed network of interconnected watertight electronics housings or "cans" spread throughout each module of the streamer.

Accordingly, in the attainment of the above primary object, the present invention provides a towed hydrophone streamer module comprising: (1) an elongated, fluid-resistant jacket having a substantially circular cross section, the water resistant jacket having mating connectors at ends thereof, (2) a plurality of sensors distributed in a spaced-apart relationship within the jacket, (3) a data bus positioned internally along a length of the jacket and terminating in electrical contacts in the mating connectors and (4) a plurality of cylindrical, fluid-resistant electronics housings disposed within the jacket in a spaced-apart relationship along a length thereof, each of the plurality of housings having a least one circuit board therein and spanning a length thereof and end caps at ends thereof, one or both of the end caps having electrical contacts coupled to components on the circuit board, a center-line of the housings substantially in alignment with a center-line of the jacket, the components coupling the plurality of sensors to the data bus for electrical communication therewith. The housings contain distributed fragments of the overall circuity required to implement data transmission from the hydrophones.

There are many advantages that come from the above module configuration. First, the prior art inter-module canisters that introduced viscous and turbulent friction, acoustic interference and streamer stowage problems are completely eliminated. This makes the streamer easier to tow and allows the streamer to make use of smaller, lighter, lower capacity strain cables and mating connectors with each module. This also cuts in half the number of mating connectors required.

Second, by distributing the electronics assemblies throughout each module, the power that is dissipated during operation of the streamer is likewise distributed evenly, thereby avoiding hotspots. Hotspots can skew acoustic data by altering the path or speed of pressure waves impinging on the hydrophones. Perhaps more importantly, hotspots can limit the life of electronic components, compromising the reliability of the streamer.

Third, because the streamer is stored on a large spool when not in use, it is of significant benefit to eliminate the stress the long, inflexible inter-module canisters place on the jacket during storage and the blocks, pads and labor required to protect the streamer from harm by the inter-module canisters while being stowed or deployed.

Fourth, since piezoelectric hydrophones are high impedance devices and the signals they produce are of relatively low power, the signals are particularly vulnerable to transmission line effects. These effects increase as a function of the length of the transmission line. Thus, because the signal processing and transmission electronics are placed closer to the hydrophones in the present invention, less noise results and acoustic data become cleaner and more reliable.

Finally, since the electronics assemblies are spread throughout each module in relatively small-diameter housings, the streamer can be made much thinner than prior art streamers (in one embodiment, only 2 inches in diameter). This creates even less friction and therefore less acoustic interference as the streamer is towed through water and makes the streamer easier to tow, lighter, easier to store on a spool and easier for levelling devices (or "birds") to maneuver when the steamer is properly ballasted.

In one embodiment of the present invention, a suspending material is disposed in the jacket to maintain the pluralities of sensors and housings in a selected position relative to the jacket. This suspending material is most often an open cell foam. A fill fluid is disposed within the jacket and the suspending material and contacts an exterior of the pluralities of sensors and housings, the fill fluid giving the module a selected specific gravity under selected conditions. In another embodiment, flexible sheaths suspend the plurality of housings in the module. Positioning blocks anchor the sheaths at opposite ends thereof.

In a preferred embodiment, the plurality of sensors comprise hydrophones, although the definition of "sensor" also includes nonacoustic sensors gathering information concerning an operation of the module, such as those detecting salt water invasion, temperature and depth.

It is important to make the plurality of housings as watertight as possible to protect the electronics assemblies therein from fill fluid or salt water invasion. This is particularly important should the streamer sink during operation. Thus, the electrical contacts exiting the housings must be insulated from the housings in a manner that does not admit fluids. In a preferred embodiment, therefore, the module further comprises a fluid-resistant insulating material between the one of the end caps and the contacts. The housings and their associated endcaps are preferably welded together to further prevent fluid invasion.

In a preferred embodiment, the housings are constructed of metal. Although stainless steel is a suitable material for the housings and is preferred because of its cost, titanium is better because of corrosion resistance and strength to weight ratio. This allows the housings to shield the sensors from electromagnetic fields generated by the components within the housings and, in turn, to shield the components from external electromagnetic fields. Stainless steel (or titanium) allows the housings to be chemically compatible with the fill fluid.

In a preferred embodiment, the module comprises a plurality of strain cables positioned along a length of the jacket, the pluralities of sensors and housings disposed radially inward of the cables. By locating the hydrophones at the radial center of the module, noise from turbulence created as the streamer is towed through the water is minimized. To further lower noise, the hydrophones are only 0.375" in diameter, as opposed to approximately an inch in diameter for prior art hydrophones. This allows the hydrophone to be further separated from the jacket. By placing the housings in the radial center, the module is made more flexible, as the suspending material or sheath is allowed to flex to compensate for any inflexibility in the housings, preventing damage to the module when it is stowed on a spool.

The foregoing has outlined rather broadly the features and technical advantages of the present invention so that the detailed description of the invention that follows may be better understood. Additional features and advantages of the invention will be described hereinafter which form the subject of the claims of the invention. Those skilled in the art should appreciate that the conception and the specific embodiment disclosed may be readily utilized as a basis for modifying or designing other structures for carrying out the same purposes of the present invention. Those skilled in the art should also realize that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
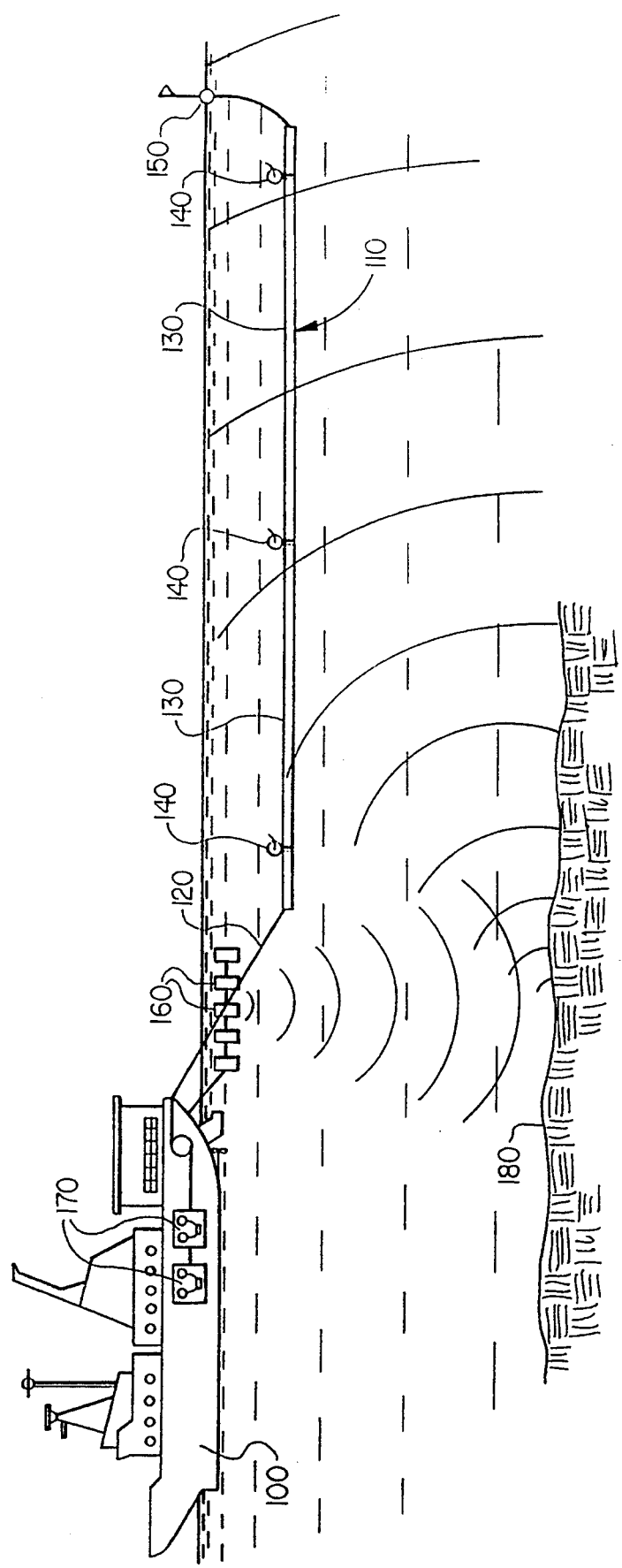
FIG. 1 illustrates an elevational view representing a towed array in operation.

Referring initially to FIG. 1, illustrated is an elevational view representing a towed array in operation. A seismic exploration vehicle 100 tows a streamer 110 behind it by way of a tow cable 120. The streamer 110 may comprise a rear buoy 150 if necessary. The streamer 110 is additionally provided with one or more leveling devices or "birds" 140 which serve to regulate the depth of the streamer 110 within the water. The seismic vessel also tows compressed air guns 160 or other sources of acoustic energy which generate an acoustic wave in the water which travels downwardly as shown, reflects at interfaces within the sea bed 180 and is detected by the hydrophones of the streamer 110.

As described in more detail below, the analog signals generated by the hydrophones within the streamer 110 upon receipt of the reflected wave are converted to digital format by analog-to-digital converters also comprised in the streamer 110 and are transmitted in digital form along the streamer 110 and up the tow cable 120 to be recorded by digital recording devices 170 on board the ship 100. The streamer 110 comprises a plurality of modules 130. Each module 130 comprises a plurality of hydrophone assemblies (individually referenced in FIG. 2). The modules 130 are connectible to each other in various numbers to make the streamer 110 any length desired, up to a practical maximum length.

Figure 2:
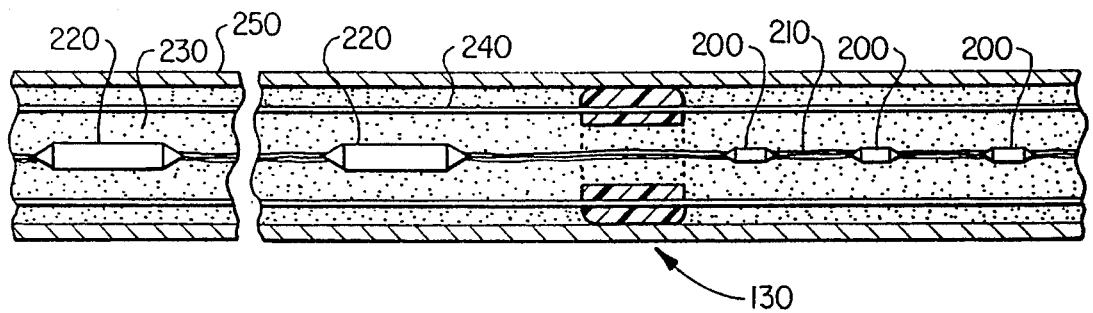
FIG. 2 illustrates a block diagram of an overall digital data system for a towed array module in the array of FIG. 1.

Turning now to FIG. 2, illustrated is a block diagram of an overall digital data system for a towed array module in the array of FIG. 1. A digital bus 200 is, in a preferred embodiment of the present invention, comprised of twisted-pair wire.

The bus 200 is divided into an auxiliary bus 201, a power bus 202, a downlink bus 203, a timing bus 204 and a combined acoustic/nonacoustic data bus 205. The auxiliary bus 201 is used, among other things to carry signals that are inductively transmitted to one of a plurality of birds (not shown) via a bird coil 210. Although the power bus 202 is a current bus and not a voltage bus, it nonetheless carries relatively high voltages (on the order of several hundred volts) at the front of the streamer. A zener diode 211 removes a portion of this voltage in each of the many modules within the array to provide, in a preferred embodiment, 6.8 volts to each module. Each of the separate housings in the module is provided with further voltage regulation. A divider 212 supplies this voltage to an input on a nonacoustic data unit ("NDU") 218 that embodies the data collection and relay circuit of the present invention. This allows the NDU 218 to detect whether the module is receiving sufficient power and to transmit an indication of the power level to the seismic exploration vehicle 100 of FIG. 1. For purposes of the present invention, nonacoustic data is defined as all data other than data acquired through the hydrophones. This includes temperature measurements, depth measurements, voltage measurements or NDU status information.

The downlink bus 203 receives downlink commands from the seismic exploration vehicle 100, delivering the downlink commands to various components within the array, including the NDU 218. The timing bus 204 carries synchronizing clock signals throughout each module in the array to allow the components therein to work in concert. The data bus 205 carries both the acoustic data derived from the hydrophones within the array and the nonacoustic data derived from nonacoustic sensors coupled to the NDU 218 in the form of interleaved packets. Data are arranged within the packets in an order representing the module order within the array.

The timing and data buses 204,205 enter a receiver 215 where packets thereon (derived from modules behind the one shown) are buffered and transmitted therefrom into a combiner/repeater unit ("CRU") 217, serving to combine the packets with acoustic and nonacoustic data derived from the module shown (and buffered in a receiver 216) into revised packets. These revised packets are transmitted to the next module via a driver 213. The CRU 217 also feeds another driver 214 which serves to coordinate the operation of a plurality of acoustic data acquisition units ("DAUs") 219, 220, 221, 222 via a local timing bus 224. Each of the DAUs 219, 220, 221, 222 communicates with a plurality of hydrophones, representationally referenced as hydrophones 223. The output from the DAUs 219, 220, 221, 222 is fed to the receiver 216 for injection into the data stream of packets on the data bus 205 via a local data bus 225.

Also providing data to the receiver 216 is the NDU 218. The NDU 218 receives timing and downlink commands via the local timing bus 224 and supplies nonacoustic data to the receiver 216 via the local data bus 225. Again, the receiver 216 acts as a buffer for the data prior to entering the CRU 217 for injection into the main data stream. In addition to deriving local module voltage from the divider 212, the NDU 218 detects saltwater invasion via conductivity sensors ("Rho cells") 226, 227 via respective lines 228, 229. The drivers 213,214, the receivers 215, 216, the CRU 217, the NDU 218 and the DAUs 219, 220, 221, 222 are housed in separate housings within and distributed throughout the module 130.

Figure 3:
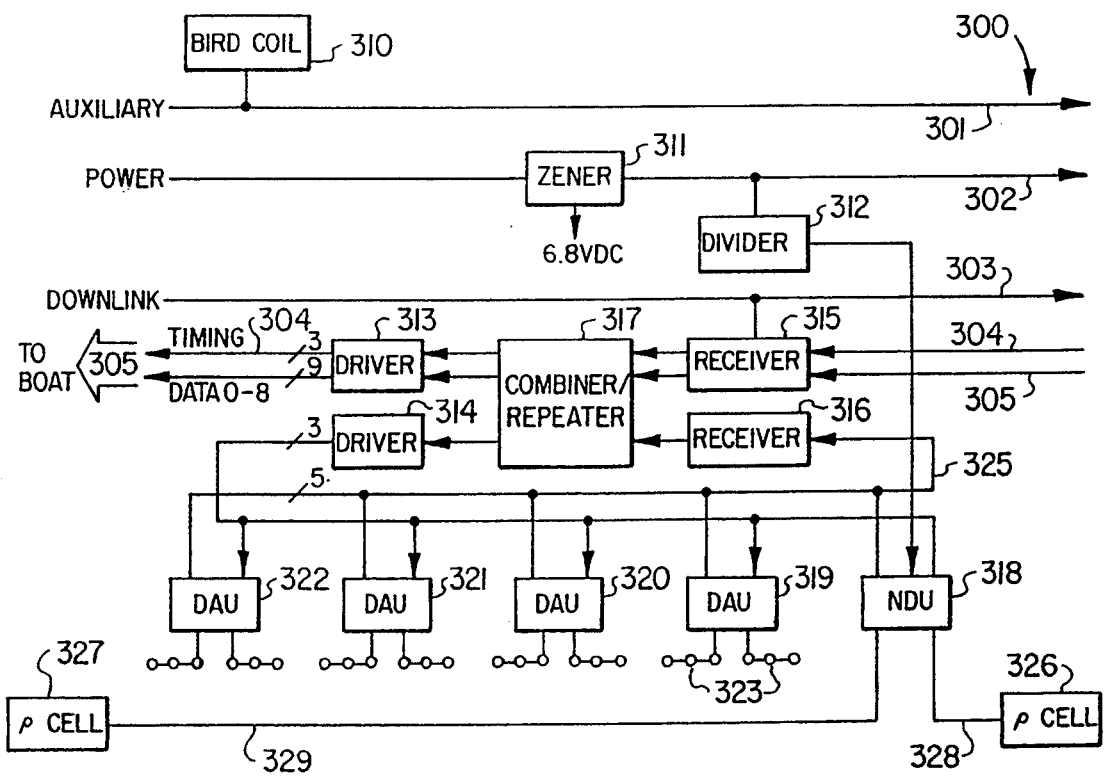
FIG. 3 illustrates a partial cross-sectional view of a typical module 130 of FIG. 1.

Turning now to FIG. 3, illustrated is a partial cross-sectional view of a typical module 130 of FIG. 1. The module 130 comprises a plurality of hydrophone assemblies 300 joined to each other by electrical cables 310. The electrical cables 310 feed into various data processing and transmission housings (such as digital data acquisition units and repeater units) 320 spread along a length of the module 130. An open-cell foam 330 and tension cables 340 reside within a waterproof jacket 350. The foam 330 laterally suspends the hydrophone assemblies 300 and the housings 320 therein and provides a surface suitable for longitudinally fixing the various housings 320 in a relatively stable spaced-apart relationship along the length of the module 130. Maintenance of this spaced-apart relationship is important to proper operation of the array because the phase of signals produced by the hydrophone array in response to pressure wave impingement is a function of hydrophone spacing.

The tension cables 340 are used to carry pulling forces generated by the towing vessel and transmitted down the towed array while it is under tow, thereby relieving the cables 310, the jacket 350 and other structures within the jacket 350 from this stress. A fill fluid having a certain desired specific gravity is entrained within the open cell foam 330. This fill fluid is chosen such that, when taken as a whole, the module has a certain desired specific gravity, preferably a neutral buoyancy with respect to sea water so as to minimize effort on the part of the "birds."

Traditionally, the entrained fill fluid is an aliphated hydrocarbon, although many other fluids have been considered. The specific gravity of the fill fluid is of primary concern. The fill fluid should also not materially attenuate the pressure wave impinging on the streamer. Finally, the fill fluid should be relatively chemically inert, such that the fluid does not harm components within the streamer. In a preferred embodiment of the present invention, the fill fluid is sold under the name NORPAR 12 ® and is an aliphated hydrocarbon.

Figure 4:
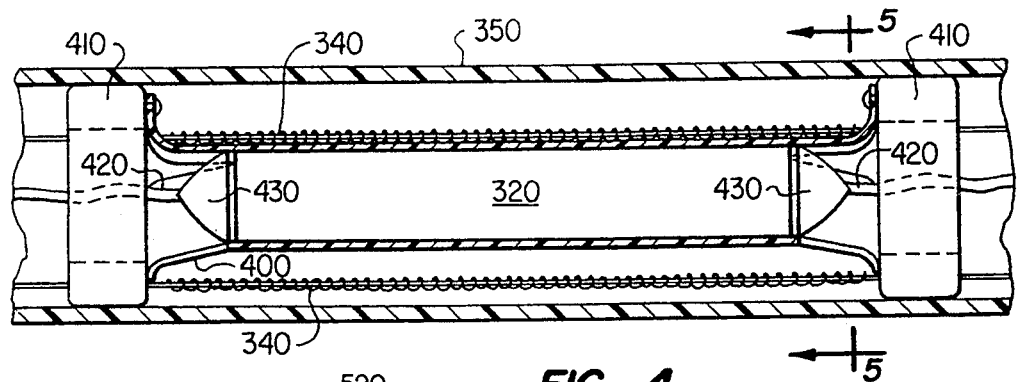
FIG. 4 illustrates an enlarged portion of the partial module illustrated in FIG. 3 featuring the housing of the present invention.

Turning now to FIG. 4, illustrated is an enlarged portion of the partial module illustrated in FIG. 3 featuring the housing of the present invention. The housing 320 is elongated and cylindrical in cross-section.

The housing 320 is suspended within the jacket 350 by a polyurethane sheath 400 that can be, in one embodiment of the invention, made of the same stock as the jacket 350. The sheath 400 is cut longitudinally at each end, producing a plurality of flange strips (more clearly shown and described in connection with FIG. 5). The flange strips are fixed by screws or other conventional means to positioning blocks 410. The blocks 410 stretch the sheath 400 and fix it axially and in a radially central position. The tension cables 340 pass through holes (not shown) in the positioning blocks 410 to maintain the blocks 410 and the cables 340 in a fixed position with respect to one another. In the illustrated embodiment, the cables 340 are loosely wrapped with a polymer spiral wrap to minimize damage to the sheath 400 in case the sheath or wiring 400 accidentally comes into contact with any one of the tension cables 340.

An electrical bus 420 passes through end caps 430 in the housing 320. The bus 420 preferably comprises a plurality of solid conductors, carries signals to and from components within the housing 320 and is shown as having slack to ensure that the tension cables 340 carry all of the tension in the streamer. The end caps 430 are shown in FIG. 4 as having a tapered profile. The tapered profile, while having slightly superior acoustic damping qualities, is also slightly more expensive to produce than flat profile end caps (illustrated in FIG. 6). Either profile is valid for purposes of the present invention. The open cell foam 330 of FIG. 3 preferably does not extend into the area surrounding the sleeve 400, although it could to provide added resilience when the streamer is wound onto a spool for storage.

Figure 5:
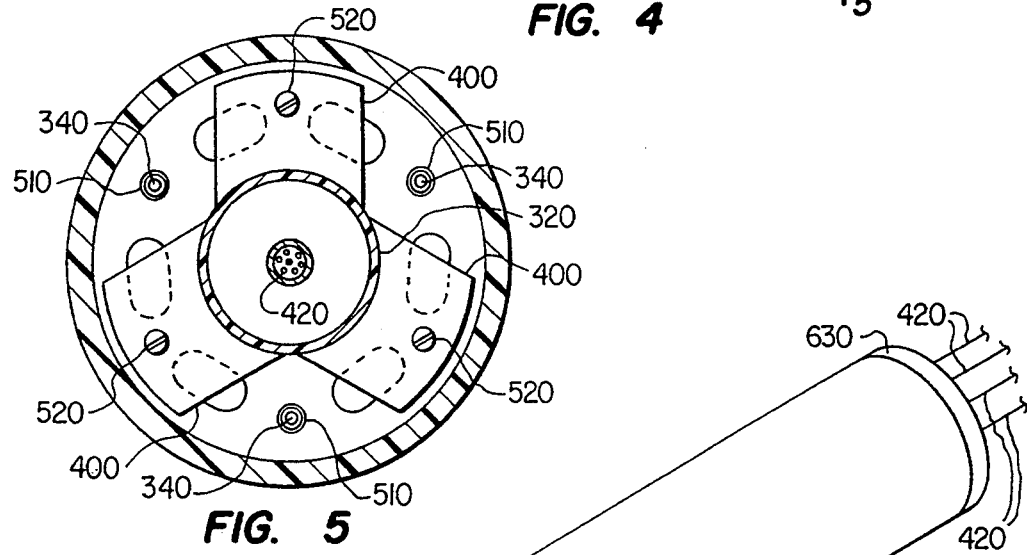
FIG. 5 illustrates a cross-sectional view of the module of FIG. 4 taken along lines 5—5.

Turning now to FIG. 5, illustrated is a cross-sectional view of the module of FIG. 4 taken along lines 5—5. The end cap 430 is fitted with a plurality of electrical pins or contacts 500 that pass through the end cap 430 to components (not shown) in the housing (not shown in FIG. 5). The contacts 500 are insulated from the end cap 430 by a conventional polymer insulator. The insulator further serves to seal the housing as against invasion by either the fill fluid in the module or by water coming from without the module. Those skilled in the art will recognize that glass o plastic insulators can substitute for the polymer insulator. The electrical bus 420 couples to these contacts to establish communication with the components in the housing.

Particularly shown in FIG. 5 is the manner in which the sheath 400 is coupled to the positioning block 410. Again, longitudinal cuts are made in the polyurethane sheath 400 to yield a number of flanges. These flanges are flared radially outwardly and are secured to the positioning block 410 by screws 520. When both ends of the sheath 400 are thus attached and the positioning blocks 410 are axially spread apart, the sheath 400 comes under tension and centers the housing 320 with respect to the jacket 350. Furthermore, tension in the sheath 400 narrows its diameter to capture the housing 320 axially, as shown. To further capture the housing 320, conventional nylon ties (not shown) may be used.

Finally, FIG. 5 shows the polymer spiral wrap 510 loosely spiraling around the tension cables 340. Again, the polymer wrap 510 isolates the sheath 400 and wiring from the tension cables 340 to prevent the tension cables 340 from abrading the sheath 400 or the wiring should they come into contact and should the tension cables 340 move axially with respect to the sheath 400.

Figure 6:
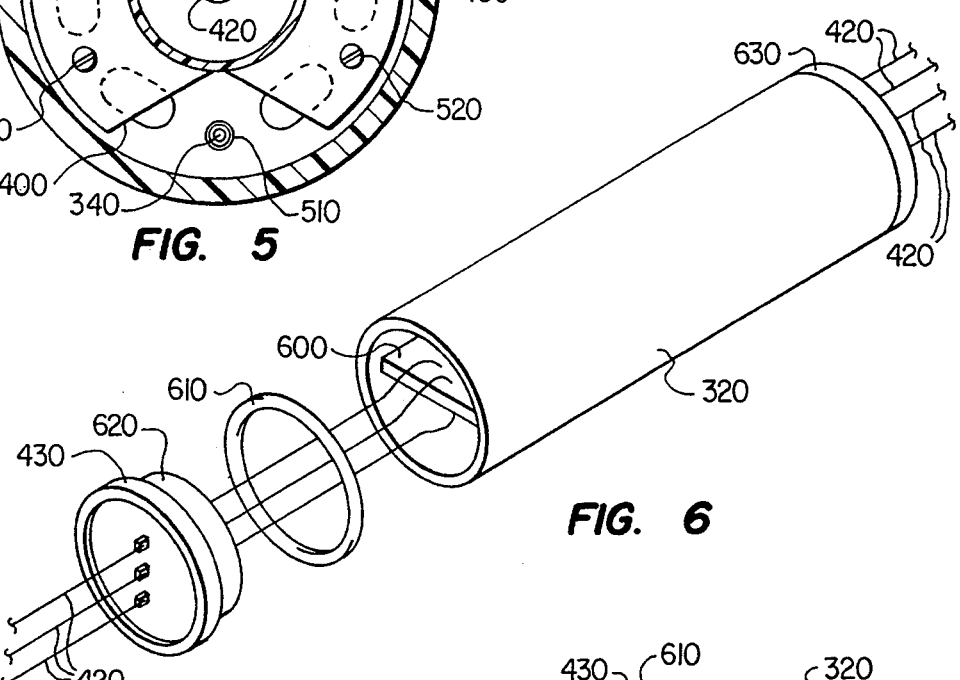
FIG. 6 illustrates an exploded isometric view of the housing of FIG. 4.

Turning now to FIG. 6, illustrated is an exploded isometric view of the housing 320 of FIG. 4. It is important to note that FIG. 6 differs from FIG. 4 with respect to the profile of the end caps 430. In FIG. 4, the end caps 430 are conical, In FIG. 5, they are flat. The housing 320 contains at least one circuit board 600 that may be a conventional printed circuit or wiring board and that contains components or electrical assemblies constituting the various digital data acquisition units and repeater units required in the streamer. Those skilled in the art will readily ascertain that these components need not be mounted on a board, but can-be "loose" within the housing 320, so long as they do not ground to the housing metal. The electrical bus 420 couples to the board 600 to make contact therewith.

The end cap 430 has a mounting flange 620 sized to create an interference fit with an inner surface of the housing 320. A spacer 610 is fitted over the mounting flange 620. In a preferred embodiment of the present invention, the end cap 430 is welded to the housing 320, producing a hermetic seal.

Figure 7:
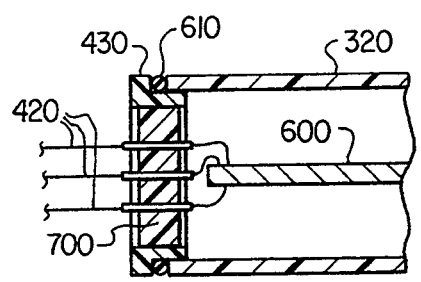
FIG. 7 illustrates a partial side view of the housing of FIG. 6.

Turning now to FIG. 7, illustrated is a partial side view of the housing 320 of FIG. 6. FIG. 7 is presented primarily for the purpose of showing a fluid-resistant insulating material 700, preferably a polymer between the end cap 430 and the various conductors comprising the electrical bus 420. Although the material does not technically produce a hermetic seal, the housing 320 is nonetheless watertight for all practical purposes.

From the above, it is apparent that the present invention provides a towed hydrophone streamer module comprising: (1) an elongated, fluid-resistant jacket having a substantially circular cross section, the water resistant jacket having mating connectors at ends thereof, (2) a plurality of sensors distributed in a spaced-apart relationship within the jacket, (3) a data bus positioned along a length of the jacket and terminating in electrical contacts in the mating connectors and (4) a plurality of cylindrical, fluid-resistant electronics housings disposed within the jacket in a spaced-apart relationship along a length thereof, each of the plurality of housings having a circuit board therein and spanning a length thereof and end caps at ends thereof, one of the end caps having electrical contacts coupled to components on the circuit board, a center-line of the housings substantially in alignment with a center-line of the jacket, the components coupling the plurality of sensors to the data bus for electrical communication therewith.

Although the present invention and its advantages have been described in detail, it should be understood that various changes, substitutions and alterations can be made herein without departing from the spirit and scope of the invention as defined by the appended claims.

What is claimed is:

1. A towed hydrophone streamer module, comprising:
    an elongated, fluid-resistant jacket having a substantially circular cross section, said water resistant jacket having mating connectors at ends thereof;
    a plurality of sensors distributed in a spaced-apart relationship within said jacket;
    a data bus positioned along a length of said jacket and terminating in electrical contacts in said mating connectors; and
    a plurality of cylindrical, fluid-resistant electronics housings disposed within said jacket in a spaced-apart relationship along a length thereof, each of said plurality of housings having a circuit board therein and spanning a length thereof and end caps at ends thereof, one of said end caps having electrical contacts coupled to components on said circuit board, a center-line of said each of said plurality of housings held substantially in alignment with a center-line of said jacket by a sheath terminating at and stretched between a pair of positioning blocks proximate said each of said plurality of housings to constrict said sheath about said each of said plurality of housings, said components coupling said plurality of sensors to said data bus for electrical communication therewith.

2. The module as recited in claim 1 further comprising a suspending material disposed in said jacket to maintain said pluralities of sensors and housings in a selected position relative to said jacket.

3. The module as recited in claim 1 further comprising a fill fluid disposed within said jacket and contacting an exterior of said pluralities of sensors and housings, said fill fluid giving said module a selected specific gravity.

4. The module as recited in claim 1 wherein said diameter of said jacket is less than 2.8 inches.

5. The module as recited in claim 1 wherein said plurality of sensors comprise hydrophones.

6. The module as recited in claim 1 wherein one of said plurality of sensors gathers information concerning an operation of said module.

7. The module as recited in claim 1 further comprising a fluid-resistant insulating material between said one of said end caps and said contacts.

8. The module as recited in claim 1 further comprising a weld joint between said end caps and said each of said plurality of housings.

9. The module as recited in claim 1 wherein said plurality of housings shield said sensors from electromagnetic fields generated by said components.

10. The module as recited in claim 1 further comprising a plurality of strain cables positioned along a length of said jacket, said pluralities of sensors and housings disposed radially inward of said cables.

11. A towed hydrophone streamer module, comprising:
   a substantially cylindrical jacket having a diameter less than 2.5 inches and a plurality of sensors and a suspending material therein, said suspending material adapted to secure said sensors resiliently within said jacket, said jacket further containing a fill fluid therein, said fill fluid giving said hydrophone module a selected specific gravity; and
   a pair of elongated, substantially cylindrical electronics housings suspended in said suspending material at spaced-apart positions within said jacket, said pair containing electronics assemblies adapted to receive and process signals from said sensors, said housings preventing said fluid from contacting said electronics assemblies, a center-line of each of said pair of housings held substantially in alignment with a center-line of said jacket by a sheath terminating at and stretched between a pair of positioning blocks proximate said each of said pair of housings to constrict said sheath about said each of said pair of housings.

12. The module as recited in claim 11 wherein said pair of housings are composed of a metal.

13. The module as recited in claim 11 wherein each of said housings comprises a pair of end caps sealingly fixed to opposite ends thereof, one of said end caps allowing electrical conductors to pass therethrough to couple said electronics assemblies to said sensors.

14. The module as recited in claim 11 wherein said pair of housings are disposed coaxially within said jacket.

15. The module as recited in claim 11 wherein said suspending material is an open cell foam.

16. The module as recited in claim 11 further comprising a data bus positioned along a length of said jacket and coupled to said electronics assemblies for communication therewith.

17. The module as recited in claim 11 wherein said plurality of sensors comprise hydrophones.

18. The module as recited in claim 11 wherein one of said plurality of sensors gathers information concerning an operation of said module.

19. The module as recited in claim 11 wherein said pair of housings shield said sensors from electromagnetic fields generated by said electronics assemblies.

20. The module as recited in claim 11 further comprising a plurality of strain cables positioned along a length of said jacket, said plurality of sensors and said pair of housings disposed radially inward of said cables.

* * * * *